May 19, 1970     J. E. YOUNG     3,513,449
WAVEFRONT RECONSTRUCTION METHOD USING RECORDING
MEDIA CONTAINING DICHROMOPHORIC BODIES
Filed Dec. 19, 1966

INVENTOR.
JAMES E. YOUNG
BY Ronald Zibelli
Stefan J. Klauber
ATTORNEYS 3,513,449
WAVEFRONT RECONSTRUCTION METHOD USING RECORDING MEDIA CONTAINING DICHROMOPHORIC BODIES
James E. Young, Pittsford, N.Y., assignor to Xerox Corporation, Rochester, N.Y., a corporation of New York
Filed Dec. 19, 1966, Ser. No. 602,708
Int. Cl. G02b 27/22, 5/30
U.S. Cl. 340—173             4 Claims

---

ABSTRACT OF THE DISCLOSURE

A wavefront reconstruction method is set forth utilizing recording media comprising a pre-oriented dispersion of dichromophoric photoconductive bodies contained in an insulating softenable matrix. Through the intermediate use of a latent electrostatic image on the surface of the recording media the dispersed bodies are selectively re-oriented in accordance with the phase and intensity of an impinging wavefront. Reconstruction of the original wavefront is achieved by illuminating the oriented recording media with a plane polarized wave originating from the same source utilized in the recording process.

---

Background of the invention

Recent investigation by numerous investigators, including in particular the work of J. Upatnieks and E. Leith (see e.g. J. Optical Society America 521,123 (1962) and 541,295 (1964)) have led to an entirely new field of optical technology generally identified under the phrase "holography." The technology represented therein has taught how it is possible to record information representative of the actual waveform emanating from an illuminated object and furthermore how it is possible to thereafter utilize the recorded information to reconstruct a precise replica of the original wavefront. In general this has been accomplished by illuminating the object to be recorded with coherent, relatively monochromatic light, originating as for example from a laser source or the like, and then combining the reflected wavefront returning from the object at a spaced recording surface with a plane wave made to impinge upon the recording surface at a slight angle. Because of this slight angle present between the plane or so called "reference" wave a predictable change in phase occurs linearly across the recording surface and as the plane wave combines with the reflected wave from the object an interference pattern occurs at the recording surface which is indicative of the modulation of the plane wave by the reflected—or object wave. Subsequently the interference pattern developed upon the recording surface may be utilized in reconstruction of the original wavefront eminating from the object by directing upon the recorded hologram a plane coherent wave.

It should be noted in connection with the foregoing description of the holographic process that the actual physical quantity recorded in the hologram itself is intensity. That the measure of intensity alone should be sufficient to thereafter reconstruct the wavefront proper derives from the fact that the intensity as so recorded actually represents the interference pattern produced between the plane reference wave and the original wavefront. That is to say that the intensity pattern actually carries in an encoded form information respecting not only the intensity from point to point in the object wavefront but information as well regarding the phase. The reference wave in this mode of recording is therefore seen to be an indispensable adjunct in that without it recording of the phase characteristics of the wavefront is impossible. While it would obviously the desirable to eliminate use of the reference wave this has not in the past been achievable because of the fact that the recording materials utilized—which have generally been of the silver halide type—are sensitive only to intensity of impinging light and in no sense record phase information.

Now in accordance with the present invention I have discovered a method and recording media utilizable therewith which enables the intensity and phase of a wavefront to be recorded directly.

It may accordingly be regarded as an object of the present invention to provide a method whereby intensity and phase of an impinging wavefront may be recorded directly and without the supplementary use of a reference wavefront.

It is a further object of the present invention to provide a recording media sensitive to both intensity and phase of an impinging wavefront.

It is an additional object of the present invention to provide a wavefront recording and reconstruction method according to which use of a reference wavefront is obviated both in the recording and reconstruction process.

Summary of the invention

In the present invention these and other objects as will become apparent in the course of the ensuing specification, are achieved in a preferred embodiment through use of a recording media comprising a pre-oriented dispersion of dichromophoric (dichoric) photoconductive bodies contained in an insulating softenable matrix. As will hereinafter be shown, such bodies may—by a technique to be set forth—be selectively re-oriented in accordance with the phase and intensity of an impinging wavefront. In their newly re-oriented position the bodies may thereafter be frozen, as a result of which a permanent record is achieved of the wavefront itself. Reconstruction of the original wavefront is thereafter achieved by illuminating the oriented recording media with a plane polarized wave originating from the same source utilized in the recording process. As phase retardation will occur in portions of the illuminating wave in accordance with the path of portions thereof through the dichromaphors the resulting emergent wave at the far side of the recording medium displays phase and intensity properties in accord with the wavefront originally recorded.

Brief description of the drawings

A fuller understanding of the present invention, of its mode of operation, and of the manner in which it achieves the objects previously set forth, may now best be gained by a reading of the following detailed specification and by a simultaneous examination of the drawings appended hereto in which.

Description of the preferred embodiment

Figure 1:
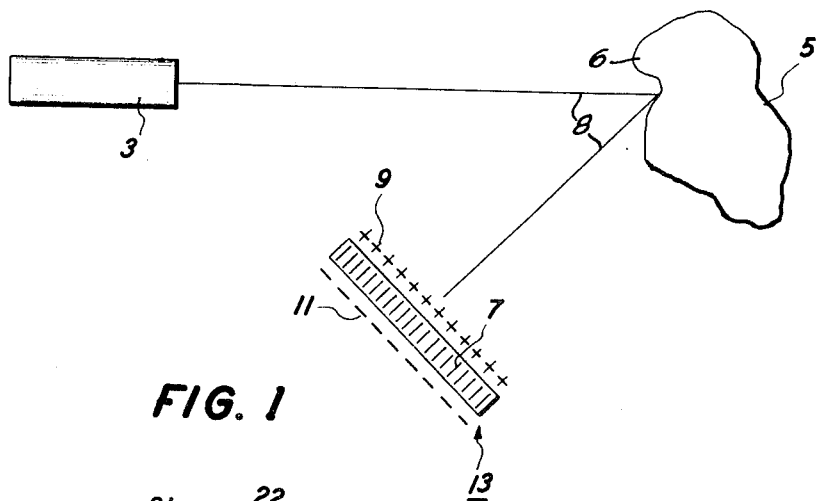
FIG. 1 is a schematic diagram illustrating the general arrangement for recording information in accord with the present invention.

In FIG. 1 an object 5 is shown illuminated by a source 3 of highly coherent relatively monocromatic radiation. The latter may suitably comprise a pulsed short duration laser which will be chosen to possess a color match with the dichromophoric bodies 7 dispersed in the recording medium 13. This is to say that the spectral characteristics of the light source utilized will be chosen as nearly as possible to coincide with the spectral absorption characteristics of the dichromophoric bodies 7. The object 5 is shown in FIG. 1 on a greatly enlarged scale so as to emphasize the irregular nature of its surface 6. For purposes of analysis it would be desirable to actually consider the object as being of such small dimensions that wavefronts reflected therefrom do not cross-modulate one another.

A representation light ray 8 eminating from the light source 3 is shown impinging upon a portion of the object 5 where it is reflected to recording surface 13. The latter is seen to contain a number of oriented photoconductive dichromophoric bodies 7. The term "dichromophoric bodies" or "dichromophore" in this specification refers to the individual, microscopic dichroic entity, although sometimes in the literature this name is reserved for one particular part of the absorbing entity, the part that is responsible for dichroism. The dichromophores may be chosen from an abundance of availbale compositions, but typically will be of sub-microscopic or even molecular size. These bodies by definition will exhibit dichroicism, which is to say that the materials will be chosen to exhibit preferential absorption for polarized light as a function of the angle such incident radiation makes with respect to a preferred direction in the body. The term dichroism, when used quantitatively, means the difference between the principal absorbency coefficients. The quantity $(a_w - a_v)$ may be called the first dichroism, $D_{wv}$; $(a_v - a_u)$ is the second dichroism, $D_{vu}$; $(a_w - a_u)$ is the overall dichroism $D_{wu}$.

Typically the dichromophoric pohtoconductive materials of the present invention may constitute crystalline or subcrystalline structures. In most instances, the dichromophores are needle-shaped and have a prolate (positive) absorption indicatrix; also, the long axis is in most instances parallel to the major principle absorption axis. The more successful types of dichromophore molecules are those that have (1) strong absorption and large dichroism throughout the desired range of wave lengths, (2) an absorption band that is due to a structure having a pronounced dipole moment within the molecule, (3) a long thin shape, and (4) an absorption axis that is parallel to the long axis. Further details concerning dichromophores and their properties may be found in chapter 4 of Shurcliff, "Polarized Light," Harvard University Press, Cambridge, Mass., 1962. The dispersed dichromophoric bodies may by way of examples comprise aligned dispersions of one or more of the following organic dye molecules: National Erie Black GX00 (C.I. 581), Amanil Black (C.I. 395), Amanil Fast Black (C.I. 545), Tintex Black, and Logwood; other dye molecules applicable include Niagara Blue 2B (C.I. 406), Solantine Red 8 BL (C.I. 278), Niagara Navy Blue BW, Erie Green MT (C.I. 593), Erie Garnet B (C.I. 375), and Solantine Black L (Prototype No. 24). Among the best dyes for the present purposes are: Congo Red, the orange dye C.I. 374, the blue dye C.I. 518, and the yellow dye C.I. 622.

Dichromophores 7 are dispersed in softenable matrix 13, which may for example comprise a transparent layer of thermoplastic material such as Stabelite 10, a rosin ester based composition available commercially from the Hercules Powder Co., Wilmington, Del., under the trade name indicated. A large list of further suitable thermoplastic materials may be found at Table I of U.S. Pat. No. 3,196,001 to K. Gunther et al. In the practice of the present invention the dichromophoric bodies 7 are initially oriented in the sheet-like matrix 13 by applying to the opposite sides thereof uniform electrostatic charge patterns 9 and 11 of respectively opposite polarities, and then (or simultaneously) placing the matrix in a compliant condition for such purposes conventional corona charging devices or the like may be utilized. The bodies 7 will orient in the electric field transverse to surface 13 since the dichromophores will usually exhibit appreciable dipole moments. The matrix may then be hardened and if necessary the charge pattern is reapplied.

The object 5, the reflective wavefront from which is to be recorded, is thereafter illuminated with coherent light from the laser source 3. The wavefronts reflected from the object impinge upon the charged and oriented recording media 13. As has previously been indicated the particular light source utilized for illumination of object 5 will be chosen to have spectral characteristics matching the absorption characteristics of dichromophoric bodies 7.

Figure 2:
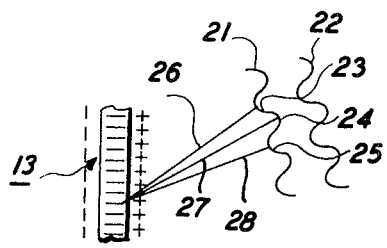
FIG. 2 shows in great magnification a portion of the recording surface utilized in the present process and depicts the mechanism by which phase and intensity information is recorded.

Referring now to FIG. 2 wavefronts such as 21 and 22, reflected from the surface 6, are shown advancing toward a portion of the recording surface 13. It can be seen in this magnified schematic showing that energy associated with varying parts of the approaching object wavefronts, can, from an analytical point of view, be thought of as impinging upon the oriented dichromophoric bodies 7 at angles that vary in accord with the particular form of the wavefront bearing such energy. Thus, for example if one considers the three points 23, 24, and 25 on the wavefront 21, and if one then applies the principle of Huygen's, whereby such points may be considered as sources of new spherical disturbances, it follows that energy propogated therefrom impinges upon given dichromophores at angles varying in accord with the paths 26, 27, and 28 respectively. However, it is characteristic of the dichromophoric body that its absorption characteristics for incident electromagnetic energy is a function of the angle with which such energy impinges with respect to a preferred axis. Accordingly, it is true that the total energy absorbed by any particular dichromophoric body in the recording media 13 will be a function not only of the intensity present at elementary points on the impinging wavefront, but as well of the particular shape of the wavefront at the point from such elementary contributions of energy originate; and that is to say that the total energy absorbed by any particular dichromophoric body will be a function of not only the intensity pattern in the approaching wavefront, but in addition will be a function of the actual shape of the total wavefront as well. But, measuring the wavefront is equivalent in operation to measuring the phase since by establishing the shape of the wavefront one obviously established the shape of common points of phase. As the dichromophoric bodies oriented in the recording surface 13 are in the preferred embodiment photoconductive in nature the enerby absorbed by any given body will be reflected in selective dissipation of charge at the associated and adjacent surfaces to the body. The result is that once the source of coherent radiation is extinguished a charge pattern will be found to have resulted upon the recording surface indicative of both the intensity and relative phase of the reflected object wavefront.

Figure 3:
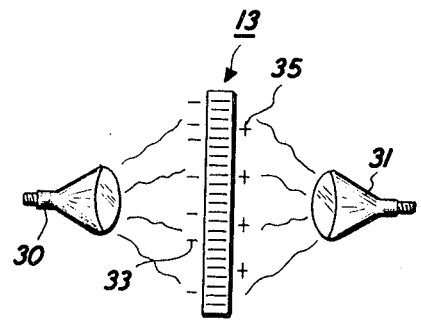
FIG. 3 schematically illustrates the application of thermal energy to achieve random orientation in field weakened areas of the recording media.

The next step in the process involves utilization of the electrostatic field associated with the aforementioned charge pattern to selectively reorient the dispersed dichromophores. In the simplest instance this can be achieved by merely applying thermal agitation to the dispersed particles, which will then become disoriented in inverse accord with the charge remaining at the vicinity thereof. Thermal agitation may be accomplished in any convenient manner—e.g. in FIG. 3 radiant heat from an infrared rich source 31 is applied to recording medium 13 bearing the now modified charge patterns 33 and 35. The thermal energy from source 31 acts both to render matrix 13 compliant and to provide random agitation for bodies 7. Alternatively disorientation of dichromophores 7 in weakened electric field areas can be brought about by application of a randomly rotating magnetic field while the matrix 13 is in a compliant condition. This latter technique is effective where—as frequently is the case—the dichromophoric bodies 7 exhibit diamagnetic properties. Once reorientation of dichromophores in field-weakened areas is accomplished the matrix-softening influence is removed, whereby the orientation pattern of the dichromophores is made permanent and a record of the wavefront is secured.

Figure 4:
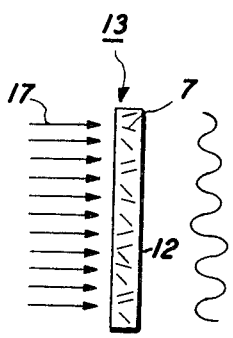
FIG. 4 schematically illustrates the manner in which an oriented medium prepared in accordance with the invention is utilized for achieving reconstruction of the original wavefront.

Reconstruction of the original wavefront is thereafter achieved by the exceedingly simple technique depicted in FIG. 4. It is only necessary to illuminate the oriented recording surface 13 with a plane polarized wave 17 originating from the same source 3 as was utilized in the recording process. Assuming, for example, that the plane wave is transmitted through the recording media it is evident that portions of the wave incident on surface 13 will emerge at the far side thereof after transversing paths through the various dichromophoric bodies 7 in accord with the aforementioned electrostatic charge pattern. Absorption as well as phase retardation will occur in such portions of the wave in accord with the path traversed through the dichromophores. Accordingly the resulting emergent wave at the side 12 of the recording surface 13 is phase and intensity modulated as was the original wave recorded.

While the present invention has been particularly described in terms of specific embodiments thereof, it will be evident in view of the present disclosure that numerous modifications of the invention may now be readily devised by those skilled in the art without departing from the teaching herein. For example the present result has—in the preferred embodiment set forth herein—been achieved through the utilization of photoconductive dichromophores. Yet it will be clear that photovoltaic bodies displaying proper dichroic properties could be employed with equal effect. Along a similar vein it will be evident that any highly coherent and collimated light source may be utilized in the instant teaching; no limitation to a laser source is intended or should be inferred.

Accordingly the present invention is to be broadly construed and limited only by the scope and spirit of the claims now appended hereto.

What is claimed is:
1. A method for recording intensity and phase of a coherent electromagnetic wavefront comprising
    (a) applying uniform electrostatic charge patterns of differing respective polarities to opposite insulating faces of a recording member containing oriented dichromophoric bodies, said bodies being absorptive of electromagnetic energy at the frequency associated with said wavefront; and adopted to dissipate charge at points of the said faces adjacent thereto in response to radiation incident therein;
    (b) positioning for a limited period said member in the path of said wavefront, whereby the energy absorption of said bodies varies in accord with the form of said wavefront, whereby said charge pattern is selectively dissipated in accord with the form of said wavefront;
    (c) rendering said dichromophoric bodies mobile and reorienting said bodies in accord with said charge pattern and hence in accord with the form of said wavefront; and
    (d) rendering said bodies immobile to permanently record said pattern.

2. A method according to claim 1 wherein said bodies are photoconductive.
3. A method according to claim 2 wherein said recording member includes a softenable matrix in which said bodies are dispersed, said bodies being rendered mobile by softening said matrix and immobile by hardening said matrix.
4. A method for reconstructing a coherent electrical dynamic wavefront comprising
    (a) applying uniform electrostatic charge patterns of differing respective polarities to opposite insulating faces of a recording member containing oriented dichromophoric bodies, said bodies being absorptive of electromagnetic energy at the frequency associated with said wavefront; and adopted to dissipate charge at points of the said faces adjacent thereto in response to radiation incident therein;
    (b) positioning for a limited period said member in the path of said wavefront, whereby the energy absorption of said bodies varies in accord with the form of said wavefront, whereby said charge pattern is selectively dissipated in accord with the form of said wavefront;
    (c) rendering said dichromophoric bodies mobile and reorienting said bodies in accord with said charge pattern and hence in accord with the form of said wavefront;
    (d) rendering said bodies immobile to permanently record said pattern; and
    (e) transmitting through said member a plane electromagnetic wave of the same frequency as said recorded wave whereby said wave emerges from said member phase and intensity modulated in accord with the transmission path through individual of said bodies oriented in the path of said plane wave, whereby said original wave is reconstructed.

References Cited

UNITED STATES PATENTS

| | | | |
|---|---|---|---|
| 2,078,254 | 4/1937 | Land | 350—154 |
| 2,319,816 | 5/1943 | Land | 350—154 |
| 2,346,766 | 4/1944 | Land | 350—154 |
| 2,454,515 | 11/1948 | Land | 350—154 |
| 2,481,622 | 9/1949 | Rosenthal. | |
| 3,171,106 | 2/1965 | Lemmond. | |
| 3,276,031 | 9/1966 | Gaynor. | |
| 3,283,309 | 11/1966 | Gaynor. | |
| 3,333,958 | 8/1967 | Giaimo | 96—1.1 |

OTHER REFERENCES

Shurcliff: Polarized Light, Harvard University Press, 1962, p. 66.

TERRELL W. FEARS, Primary Examiner

H. L. BERNSTEIN, Assistant Examiner

U.S. Cl. X.R.

96—1.1; 350—3.5, 154